(12) United States Patent
Hwang et al.

(10) Patent No.: US 11,437,658 B2
(45) Date of Patent: Sep. 6, 2022

(54) APPARATUS FOR COLLECTING GAS IN SECONDARY BATTERY

(71) Applicant: LG CHEM, LTD., Seoul (KR)

(72) Inventors: Dongguk Hwang, Daejeon (KR); Won Kyung Shin, Daejeon (KR); Junghyun Song, Daejeon (KR); Nak Hee Choi, Daejeon (KR); Jeong Ae Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 20 days.

(21) Appl. No.: 17/268,948

(22) PCT Filed: Apr. 28, 2020

(86) PCT No.: PCT/KR2020/005560
§ 371 (c)(1),
(2) Date: Feb. 16, 2021

(87) PCT Pub. No.: WO2020/226319
PCT Pub. Date: Nov. 12, 2020

(65) Prior Publication Data
US 2021/0344055 A1    Nov. 4, 2021

(30) Foreign Application Priority Data
May 7, 2019    (KR) .................. 10-2019-0052956

(51) Int. Cl.
*H01M 10/42* (2006.01)
*H01M 10/52* (2006.01)
*H01M 50/105* (2021.01)
*H01M 50/35* (2021.01)
*G01N 1/22* (2006.01)

(52) U.S. Cl.
CPC ...... *H01M 10/4285* (2013.01); *G01N 1/2226* (2013.01); *H01M 10/52* (2013.01); *H01M 50/105* (2021.01); *H01M 50/35* (2021.01)

(58) Field of Classification Search
None
See application file for complete search history.

(56) References Cited

U.S. PATENT DOCUMENTS 10,586,999 B2    3/2020 Locke et al.
2016/0380302 A1*    12/2016 Yun ............... H01M 10/0587
                                                     29/623.5

FOREIGN PATENT DOCUMENTS

| CN | 107359299 A | 11/2017 |
|---|---|---|
| CN | 109935919 | * 6/2019 |
| JP | 2011003513 A | 1/2011 |
| JP | 2019056651 | * 4/2019 |
| KR | 1020030062511 A | 7/2003 |
| KR | 100832245 B1 | 5/2008 |
| KR | 101583373 B1 | 5/2012 |
| KR | 101641617 B1 | 11/2014 |

(Continued)

*Primary Examiner* — Lisa S Park
(74) *Attorney, Agent, or Firm* — Dentons US LLP

(57) ABSTRACT

A gas collecting apparatus for collecting gas generated in a secondary battery comprising an electrode assembly and a flexible pouch case containing the electrode assembly therein, the gas-collecting apparatus comprising an insert plate part including a through-hole and a pressing jig part having a gas moving path, and the gas-collecting apparatus capable of easily collecting the gas regardless of the standard size and shape of the secondary battery.

10 Claims, 6 Drawing Sheets

(56) References Cited

FOREIGN PATENT DOCUMENTS

| KR | 1020150062739 A | | 6/2015 |
|----|-----------------|---|--------|
| KR | 1020150107102 A | | 9/2015 |
| KR | 101590395 B1 | | 1/2016 |
| KR | 10-2016-0072571 A | | 6/2016 |
| KR | 101634310 B1 | | 6/2016 |
| KR | 1020170041103 A | | 4/2017 |
| KR | 1020180016481 A | | 2/2018 |
| KR | 20180047274 | * | 5/2018 |
| KR | 20180047274 A | | 5/2018 |
| KR | 10-2021-0103764 A | | 8/2021 |

* cited by examiner

[Fig. 1]
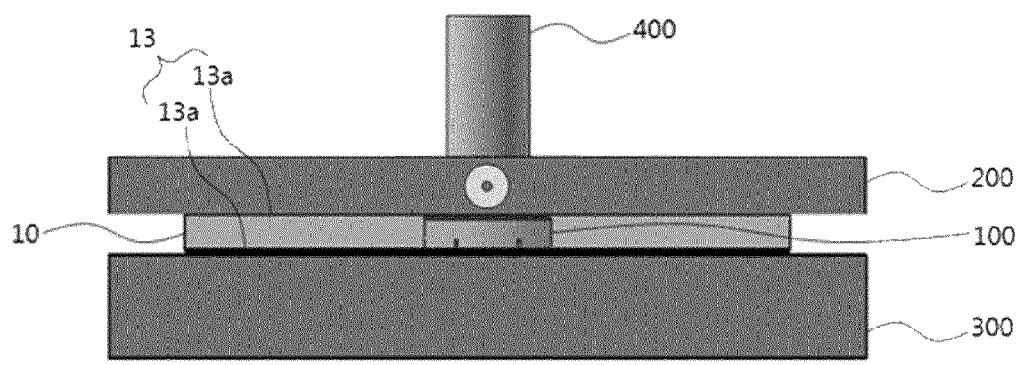
[Fig. 2]
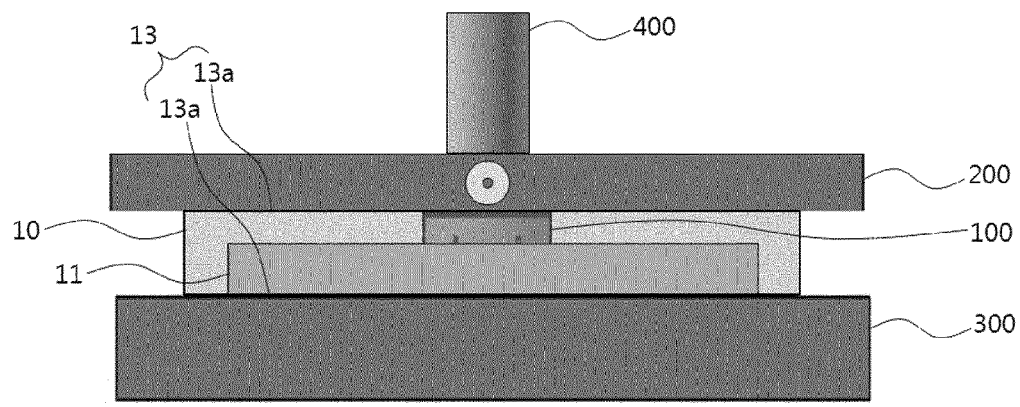

[Fig. 3]
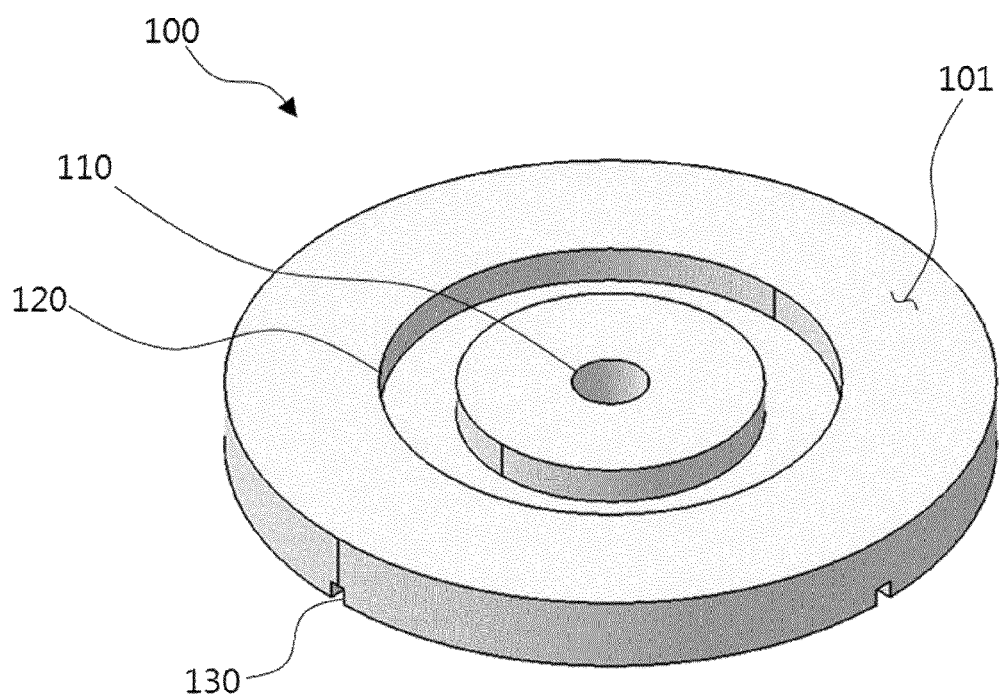

[Fig. 4]
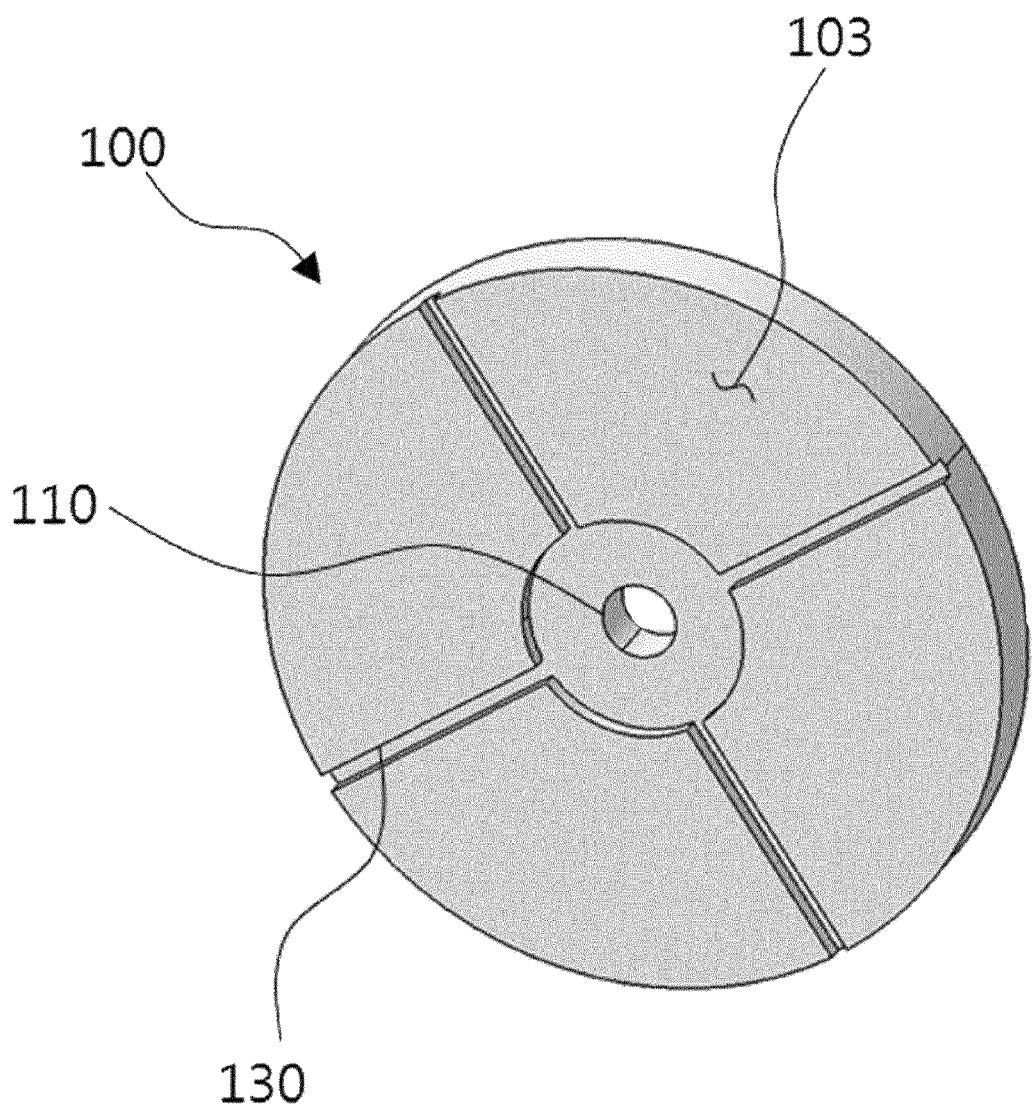

[Fig. 5a]
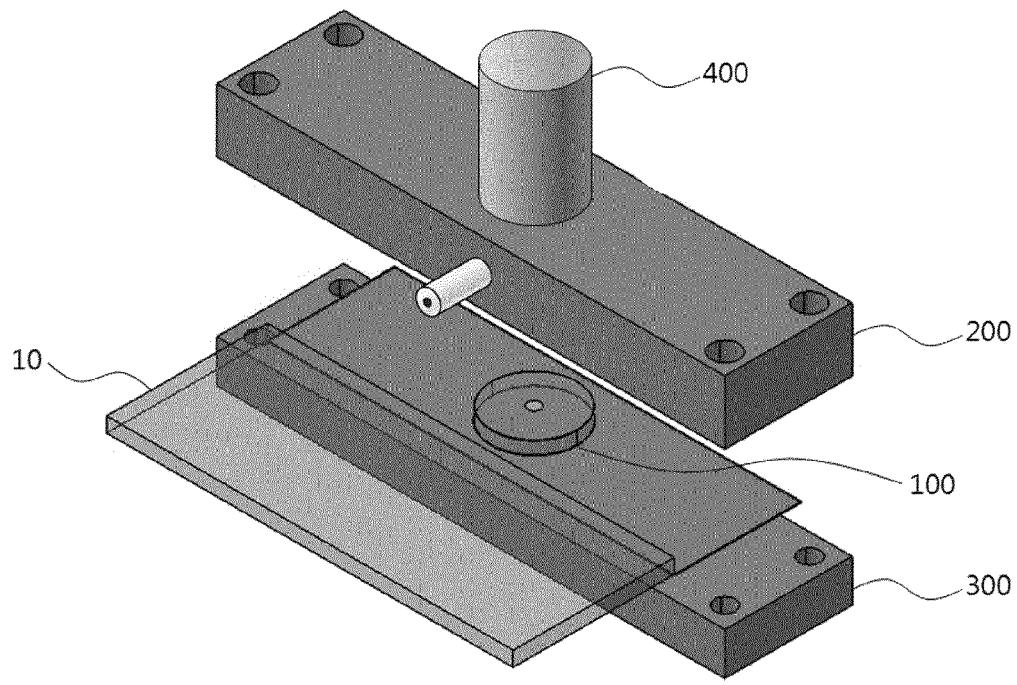
[Fig. 5b]
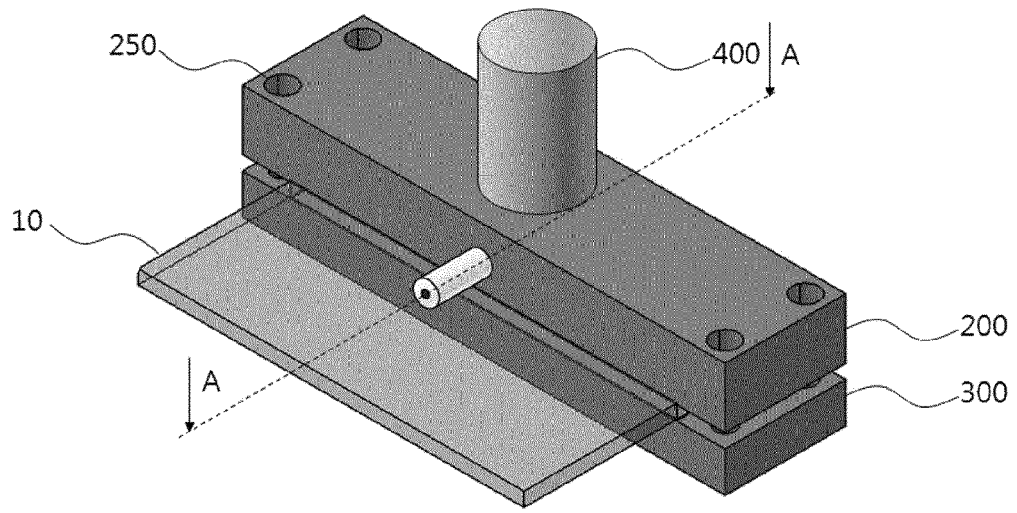

[Fig. 6]
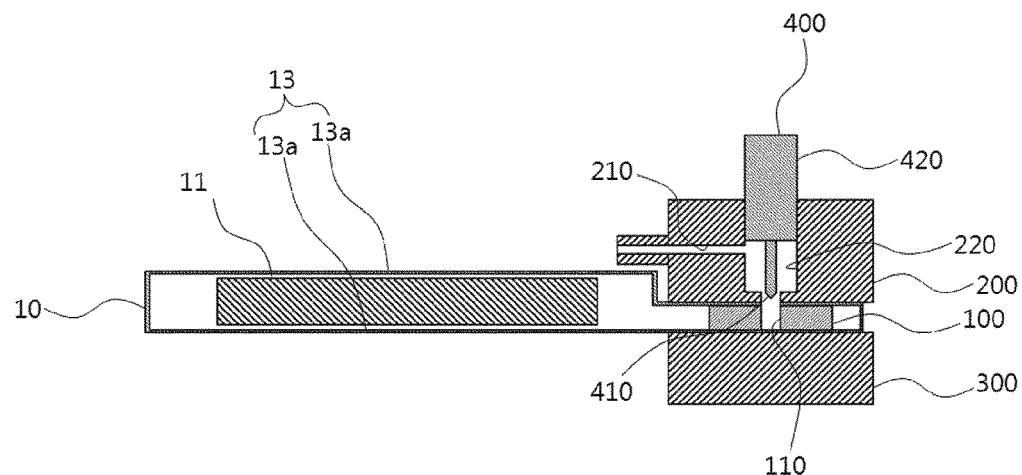
[Fig. 7]
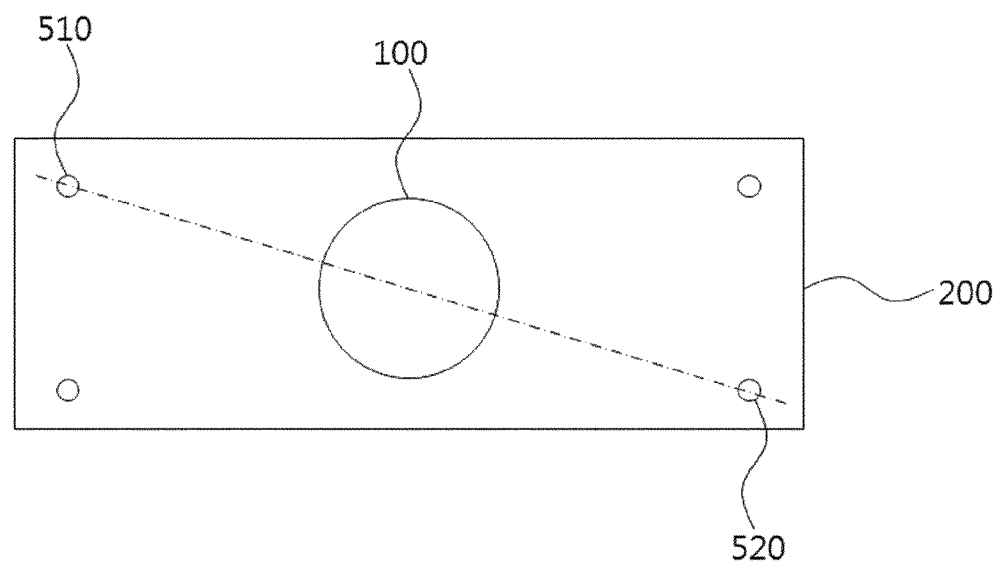

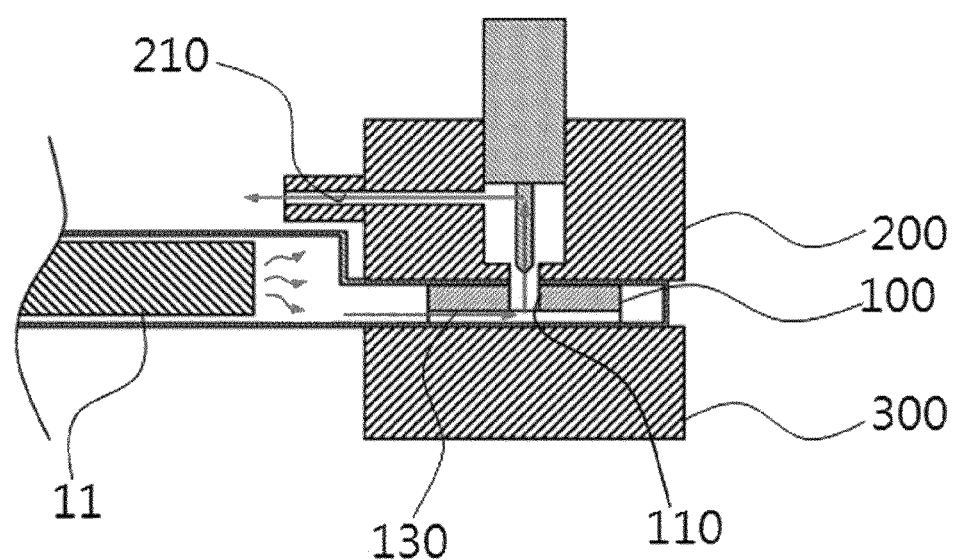
[Fig. 8]

APPARATUS FOR COLLECTING GAS IN SECONDARY BATTERY

CROSS-REFERENCE TO RELATED APPLICATIONS

This application is a National Stage Application of International Application No. PCT/KR2020/005560, filed on Apr. 28, 2020, which claims priority to Korean Patent Application No. 10-2019-0052956 filed on May 7, 2019, the disclosures of which are incorporated herein by reference in their entireties.

TECHNICAL FIELD

The present disclosure relates to a gas-collecting apparatus for collecting gas in a secondary battery, and more particularly, to a gas-collecting apparatus capable of easily collecting gas inside a secondary battery regardless of the standard dimension and the shape of the secondary battery.

BACKGROUND

In general, a secondary battery is a battery which can be repeatedly used through a discharging process converting chemical energy into electrical energy and a reverse process, a charging process, and includes, as its kind, a nickel-cadmium (Ni—Cd) battery, a nickel-hydrogen (Ni-MH) battery, a lithium-metal battery, a lithium-ion (Li-ion) battery, a lithium-ion polymer battery, etc. Among these secondary batteries, the lithium secondary batteries, which have a high energy density and voltage, a long cycle life and a low self-discharge rate, have been commercialized and widely used.

Various kinds of gases, such as hydrogen, oxygen, nitrogen, carbon monoxide, carbon dioxide, hydrocarbons such as $C_nH_{2n-2}$ (n=2~5), $C_nH_{2n}$ (n=2~5) and $C_nH_{2n+2}$ (n=1~5), other organic gas species, etc. may be generated depending on the reaction in the lithium secondary battery.

In addition, the lithium secondary battery is degraded as a large amount of gas is generated by the decomposition of an electrolyte according to repeated charging and discharging progresses, and this phenomenon appears differently depending on the design and use type of the battery. Therefore, analyzing the gas generated inside the battery to infer the degradation mechanism of the battery should essentially be performed in the development process of the battery.

Therefore, it is very important to collect and accurately analyze the gas generated in the secondary battery. Various gases are generated during operation of the lithium ion battery, and information on the composition and content of the generated gases is useful for the development of battery materials, optimization of battery manufacturing processes, and identification of causes of battery defects. To this end, it is important to develop a technology for collecting the gas generated inside the secondary battery.

Conventionally, in order to collect the gas generated in the secondary battery, the secondary battery was placed in a closed space, which was depressurized under vacuum, and then, a hole was drilled in the secondary battery to diffuse the generated gas into the closed space accommodating the secondary battery, and then, a sample was taken. Therefore, a jig is needed to enclose the entire exterior of the secondary battery to form a closed space for accommodating the secondary battery, and this jig is required to have a form conforming to the specification and shape of each different type of the secondary batteries released for various purposes (EV, ESS, mobile phone, etc.). That is, in the conventional gas collecting apparatus, since the secondary battery has various specifications such as area, thickness, etc., it is necessary to replace the jig whenever the shape and specification of the secondary battery to be inspected are changed.

Korean Laid-Open Patent Publication No. 10-2018-0047274 discloses a technique concerned with 'an apparatus and a method for collecting gas generated in a secondary battery'.

SUMMARY

Technical Problem

It is an object of the present disclosure to provide a gas-collecting apparatus for collecting gas in a secondary battery, and more particularly, a gas-collecting apparatus capable of easily collecting gas inside a secondary battery regardless of the specification and shape of the secondary battery.

The technical problems to be solved by the present disclosure are not limited to the technical problems as mentioned above, and other technical problems not mentioned will be clearly understood from the following description by those skilled in the art to which the present disclosure pertains.

Technical Solution

A gas-collecting apparatus for a secondary battery of the present disclosure is the apparatus for collecting gas generated in a secondary battery comprising an electrode assembly and a flexible pouch case accommodating the electrode assembly therein, wherein the pouch case includes a first sheet covering one surface of the electrode assembly and a second sheet covering the other surface of the electrode assembly, the apparatus comprises: an insert plate part in close contact with the first sheet inside the pouch case; and a pressing jig part in close contact with the insert plate part outside the pouch case with the first sheet interposed therebetween, wherein the insert plate part may include a through hole penetrating the insert plate part so that a first surface of the insert plate part facing the first sheet and a second surface opposite to the first surface are connected to each other; and a gas moving path of which one end is connected to the through hole and through which the gas generated in the secondary battery flows may be formed inside the pressing jig part.

Advantageous Effects

The gas-collecting apparatus for a secondary battery of the present disclosure can be utilized consistently for secondary batteries of all sizes regardless of a change in the specifications of the batteries.

The gas-collecting apparatus of the present disclosure immediately collects gas inside a pouch case without requiring a process of diffusing the gas in a separate chamber, thereby reducing a space for gas diffusion. Therefore, since the gas generated in the secondary battery can be collected in a smaller space, it is possible to increase the efficiency of analysis by collecting a high concentration of gas.

A pressing jig part of the gas-collecting apparatus of the present disclosure only needs to press an area equal to that of the insert plate part, and thus, contacts and presses only a local area of a secondary battery. Therefore, even if the jig is coupled to the secondary battery, the secondary battery has an exposed area that is not coupled to the jig. This exposed area can be used to connect accessory parts for various analyses.

The gas-collecting apparatus of the present disclosure securely fixes only a portion of the secondary battery with a pressing jig part and an insert plate part, and therefore, even if the shape and size of the secondary battery changes during the analysis, it is possible to smoothly collect the gas.

Even if the gas-collecting apparatus of the present disclosure is damaged by ignition of the secondary battery, only an insert plate part or a pressing jig part needs to be replaced, thereby reducing the maintenance cost of the apparatus.

In the case of an O-ring applied to the structure of the gas-collecting apparatus of the present disclosure, its area is 2 to 1000 times smaller than that of the O-ring used in the conventional collecting apparatuses, thereby effectively improving leakage due to the O-ring.

DESCRIPTION OF DRAWINGS

FIG. 1 is a side view showing a gas-collecting apparatus of the present disclosure.

FIG. 2 is a side view showing a gas-collecting apparatus of another embodiment of the present disclosure.

FIG. 3 is a perspective view showing a first surface of an insert plate part.

FIG. 4 is a perspective view showing a second surface of an insert plate part.

FIG. 5A is a perspective view showing a pressing jig part of a gas-collecting apparatus of the present disclosure before pressing a secondary battery.

FIG. 5B is a perspective view showing a state that a pressing jig part of a gas-collecting apparatus of the present disclosure presses a secondary battery.

FIG. 6 is a cross-sectional view showing a cross-section A-A in FIG. 5B.

FIG. 7 is a conceptual view showing a coupled relationship between a fixing means and a pressing jig part.

FIG. 8 is a cross-sectional view showing a gas moving path in a gas-collecting apparatus of the present disclosure.

BEST MODE

A gas-collecting apparatus of the present disclosure is the apparatus for collecting gas generated in a secondary battery comprising an electrode assembly and a flexible pouch case accommodating the electrode assembly therein, wherein when the pouch case includes a first sheet covering one side surface of the electrode assembly and a second sheet covering the other side surface of the electrode assembly, the apparatus comprises: an insert plate part in close contact with the first sheet inside the pouch case; and a pressing jig part in close contact with the insert plate part outside the pouch case with the first sheet interposed therebetween, wherein the insert plate part may include a through hole penetrating the insert plate part so that a first surface of the insert plate part facing the first sheet and a second surface opposite to the first surface are connected to each other; and a gas moving path of which one end is connected to the through hole and through which the gas generated in the secondary battery flows may be formed inside the pressing jig part.

In the gas-collecting apparatus of the present disclosure, it may further include a punching part inserted into the through hole from the outside of the pouch case for forming a ventilating hole in the first sheet, wherein the ventilating hole allows the gas to be discharged to the outside of the pouch case and to flow into the gas moving path.

In the gas-collecting apparatus of the present disclosure, the punching part may be coupled to a surface of the pressing jig part opposite to a surface of the pressing jig part contacting the secondary battery; and a needle hole penetrating the inside of the pressing jig part may be formed in the pressing jig part so that a needle provided in the punching part protrudes to a surface of the pressing jig part contacting the secondary battery.

In the gas-collecting apparatus of the present disclosure, a sealing groove having a closed curve shape in which the through hole is placed inside may be formed on the first surface of the insert plate part or on a surface of the pressing jig part in close contact with the first sheet; and a first sealing member made of an elastic material may be inserted into the sealing groove to prevent the gas from leaking into a contacting surface between the first sheet and the pressing jig part.

In the gas-collecting apparatus of the present disclosure, the first sealing member may be an O-ring.

In the gas-collecting apparatus of the present disclosure, the insert plate part may include a gas flow path connected to the through hole from an edge of the insert plate part.

In the gas-collecting apparatus of the present disclosure, the gas flow path may be formed by a groove extending from the through hole to an edge of the insert plate part on the second surface of the insert plate part; the gas flow path may be provided in plural; and the plurality of gas flow paths may be disposed radially symmetrically around the through hole.

The gas-collecting apparatus of the present disclosure may further include a supporting jig part facing and being in close contact with the pressing jig part, with the secondary battery interposed therebetween, outside the pouch case.

The gas-collecting apparatus of the present disclosure may further include a jig fixing mean connected to the pressing jig part and the supporting jig part to fix a relative position between the pressing jig part and the supporting jig part in a state that the pressing jig part and the supporting jig part are in close contact with the secondary battery interposed therebetween.

In the gas-collecting apparatus of the present disclosure, the jig fixing mean may be provided in plural; the jig fixing means may include a first jig fixing mean and a second jig fixing mean; and a virtual straight line connecting two points through which the first jig fixing mean and the second jig fixing mean pass on a virtual plane including the insert plate part between the pressing jig part and the supporting jig part may penetrate the insert plate part.

DETAILED DESCRIPTION

Hereinafter, embodiments according to the present disclosure will be described in detail with reference to the accompanying drawings. In the description, the size, shape or the like of elements shown in the drawings may be exaggerated for clarity and convenience of the description. In addition, terms specifically defined in consideration of the constitution and function of the present disclosure may vary depending on the intention or practice of a user or operator. Definitions of these terms should be made based on the contents disclosed throughout this specification.

In the description of the present disclosure, it should be noted that a directional or positional relationship indicated by the terms "center", "upper", "lower", "left", "right", "vertical", "horizontal", "inside", "outside", etc. is based on a directional or positional relationship shown in the drawings, or a directional or positional relationship that is usually arranged when using the product of the present disclosure; and such directional or positional relationship is only for the illustration and concise description of the present disclosure and does not necessarily suggest or imply that the indicated apparatus or element must have a specified direction and must be constructed or manipulated with the specified direction, and thus, should not be construed as limiting the present disclosure.

Hereinafter, the configuration and function of the gas-collecting apparatus of the present disclosure will be described in detail with reference to FIGS. 1 to 8.

FIG. 1 is a side view showing a gas-collecting apparatus of the present disclosure. FIG. 2 is a side view showing a gas-collecting apparatus of another embodiment of the present disclosure. FIG. 3 is a perspective view showing a first surface of an insert plate part. FIG. 4 is a perspective view showing a second surface of an insert plate part. FIG. 5A is a perspective view showing a pressing jig part of a gas-collecting apparatus of the present disclosure before pressing a secondary battery. FIG. 5B is a perspective view showing a state that a pressing jig part of a gas-collecting apparatus of the present disclosure presses a secondary battery. FIG. 6 is a cross-sectional view showing a cross-section A-A in FIG. 5B. FIG. 7 is a conceptual view showing a coupled relationship between a fixing means and a pressing jig part. FIG. 8 is a cross-sectional view showing a gas moving path in a gas-collecting apparatus of the present disclosure.

The gas-collecting apparatus of the present disclosure may be the apparatus for collecting gas generated in a secondary battery 10 comprising an electrode assembly 11 and a flexible pouch case 13 accommodating the electrode assembly 11 therein. That is, the gas-collecting apparatus of the present disclosure may be applied to the secondary battery 10 in which the pouch case 13 forming an outer shape is made of an easily deformable material. For example, the pouch case 13 may be an aluminum pouch (Al pouch). Although the gas-collecting apparatus of the present disclosure may also be applied to a secondary battery 10 having a rigid case, it may be more effective for a secondary battery 10 in which a flexible pouch case 13 forms the exterior. In the case of the flexible pouch case 13, its volume may be changed according to a variation in the internal and external pressure of the secondary battery 10. The gas-collecting apparatus of the present disclosure securely fixes only a portion of the secondary battery 10 with a pressing jig part 200 and an insert plate part 100, and therefore, even if the shape and size of the secondary battery 10 are changed during analysis, gas collection can be smoothly performed.

As shown in FIGS. 1 and 2, when the pouch case 13 includes a first sheet 13a covering one side surface of the electrode assembly 11 and a second sheet 13b covering the other side surface of the electrode assembly 11, the gas-collecting apparatus of the present disclosure may comprise: an insert plate part 100 in close contact with the first sheet 13a inside the pouch case 13; a pressing jig part 200 in close contact with the insert plate part 100 outside the pouch case with the first sheet 13a interposed therebetween; a punching part 400 for drilling a ventilating hole in the pouch case 13 wherein the ventilating hole allows the gas generated inside the secondary battery 10 to be discharged to the outside of the pouch case 13; and a supporting jig part 300 facing and being in close contact with the pressing jig part 200, with the secondary battery 10 interposed therebetween, outside the pouch case 13.

FIG. 1 shows an embodiment in which an insert plate part 100 is positioned to directly contact the first sheet 13a and the second sheet 13b of the pouch case 13. FIG. 2 shows another embodiment in which the insert plate part 100 is positioned such that one side surface of the insert plate part 100 contacts with an inner surface of the pouch case 13, while the other side surface contacts with the electrode assembly 11. The pouch case 13 may be made larger than the electrode assembly 11, and in this case, the electrode assembly 11 may not be present near an edge of the pouch case 13. Therefore, in the center region of the secondary battery 10, the first sheet 13a-electrode assembly 11-second sheet 13b may be stacked in the order, whereas in the edge region, the first sheet-second sheet 13b may be stacked in the order. The position of the insert plate part 100 may be selectively determined by physical properties of the pouch case 13, experimental conditions, the shape of the electrode assembly 11, and the like. The position of the insert plate part 100 may be determined according to the analysis situation and conditions without limitation within the pouch case 13. However, in order to minimize the effect of the electrode, the insert plate part 100 may be positioned at a position spaced apart from the electrode by a certain distance so as to avoid contact with the electrode.

The insert plate part 100 is in close contact with an external pressing jig part 200 inside the pouch case 13, whereby the gas generated in the secondary battery 10 can be moved without leakage to a gas moving path 210 provided inside the pressing jig part 200. The insert plate part 100 may be a disc-shaped plate having a thickness.

The insert plate part 100 is made of a material having properties such as corrosion resistance, heat resistance, abrasion resistance and chemical resistance, and the material of the insert plate part 100 may include one or more of teflon and bakelite as a polymeric insulating material. The insert plate part 100 is directly exposed to the gas generated in the secondary battery 10, and may have a path through which the gas passes. Therefore, if damage such as corrosion, wear, deterioration, deformation, etc. occurs in the insert plate part 100, a flow path for gas collection may be blocked or the generated gas may leak out. If the component separated from the insert plate part 100 is mixed with the gas, it may affect the analysis results.

The insert plate part 100 may be inserted during or after the manufacturing process of the secondary battery 10, and may not affect the manufacturing and activation process of the secondary battery 10, and the like.

As shown in FIGS. 3 and 4, the insert plate part 100 may include a through hole 110 penetrating the insert plate part 100 so that a first surface 101 of the insert plate part 100 facing the first sheet 13a and a second surface 103 opposite to the first surface 101 are connected to each other. For example, the through hole 110 may be provided to form a passage in a direction perpendicular to a surface of the insert plate part 100.

The through hole 110 may be a passage through which the internal gas of the secondary battery 10 moves. The gas introduced into the second surface 103 of the insert plate part 100 through the through hole 110 is discharged to the first surface 101, and the gas may be delivered to an external analysis apparatus. In addition, a ventilating hole may be formed in the pouch case 13 by inserting a needle 410 into the through hole 110 of the insert plate part 100 located inside the pouch case 13 from the outside of the pouch case 13. That is, the through hole 110 may be a passage through which the gas moves, while also being a guide for forming a ventilating hole.

As shown in FIG. 3, a sealing groove 120 having a closed curve shape in which the through hole 110 is placed inside may be formed on the first surface 101 of the insert plate part 100. For example, the sealing groove 120 may be formed of a circular ring, and the through hole 110 may be located in the center of the ring. The shape and size of the sealing groove 120 may be the same as those of the first sealing member inserted into the sealing groove 120. For example, if an O-ring as a first sealing member is inserted into the sealing groove 120, the sealing groove 120 may have the same shape as that of the O-ring. The sealing groove 120 may also be formed on a surface of the pressing jig part 200 in close contact with the first sheet 13a, or may be provided in both the insert plate part 100 and the pressing jig part 200.

A first sealing member made of an elastic material is inserted into the sealing groove 120 to prevent gas from leaking into a contacting surface between the first sheet 13a and the pressing jig unit 200. The first sealing member may be an O-ring. Specifically, in a state that the insert plate part 100 is inserted into the pouch case 13 so that the first surface 101 of the insert plate part 100 contacts with the first sheet 13a, the first sealing member is disposed at the position of the sealing groove 120 outside the pouch case 13, and then, the first sealing member may be pressed by the pressing jig part 200 so as to be inserted into the sealing groove 120. The first sealing member is inserted into the sealing groove 120, whereby the pouch case 13 between the first sealing member and the sealing groove 120 may also be pressed and inserted. When the first sealing member is pressed by the pressing jig part 200, it may be deformed to fill and seal a gap between the first sealing member and the first sheet 13a and a gap between the first sealing member and the pressing jig part 200.

In the case of an O-ring applied to the structure of the gas-collecting apparatus of the present disclosure, its area is 2 to 1000 times smaller than that of the O-ring used in the conventional collecting apparatuses, thereby effectively improving leakage due to the O-ring.

As shown in FIG. 4, the insert plate part 100 may include a gas flow path 130 connected from an edge of the insert plate part 100 to the through hole 110. Specifically, the gas flow path 130 may be formed by a groove extending from the through hole 110 to the edge of the insert plate part 100 on the second surface 103 of the insert plate part 100. The gas flow path 130 may be provided in plural, and the plurality of gas flow paths 130 may be disposed radially symmetrically around the through hole 110. For example, one end of the gas flow path 130 may be connected to the through hole 110 formed in the center of the disk-shaped insert plate part 100, and the other end may be connected to the edge of the insert plate part 100. That is, the insert plate part 100 may have the sealing groove 120 formed on the first surface 101, the gas flow path 130 formed on the second surface 103, and the through hole 110 formed to connect the first surface 101 and the second surface 103.

As shown in FIGS. 5A and 5B, the pressing jig part 200 may press the insert plate part 100 inside the pouch case 13 from the outside of the pouch case 13. The pressing jig part 200 presses the insert plate part 100, whereby a sealing is made to prevent gas from leaking to the outside, and at the same time, the relative position between the insert plate part 100 and the punching part 400 forming a ventilating hole in the pouch case 13 are fixed, so that the through hole 110 and the ventilating hole may be formed in a position to face each other.

A pressing jig part 200 of the gas-collecting apparatus of the present disclosure only needs to press an area equal to that of the insert plate part 100, and thus, contacts and presses only a local area of the secondary battery 10. Therefore, even if the jig is coupled to the secondary battery 10, the secondary battery 10 has an exposed area that is not coupled to the jig. This exposed area can be used to connect accessory parts for various analyses. For example, the accessory parts may be a pressing jig, an insulating material, or the like.

The gas-collecting apparatus of the present disclosure can be utilized for batteries of all sizes regardless of the specifications such as the area, thickness, etc. of the secondary battery 10.

As shown in FIG. 6, a gas moving path 210 of which one end is connected to the through hole 110 and through which the gas generated in the secondary battery 10 flows may be formed inside the pressing jig part 200. An inlet of the gas moving path 210 may be formed on a surface facing the pouch case 13. Specifically, the inlet of the gas moving path 210 may be formed at a position facing the through hole 110 of the insert plate part 100 among the surfaces facing the pouch case 13. Therefore, the gas discharged through the through hole 110 may directly flow into the inlet of the gas moving path 210. The gas moving path 210 may be formed to discharge the gas to the side surface of the pressing jig part 200 via the inside of the pressing jig part 200. That is, an outlet of the gas moving path 210 may be formed on the side surface of the pressing jig part 200. The outlet of the gas moving path 210 may be formed on any surface of the pressing jig part 200, but may be preferably formed on the side surface of the pressing jig part 200 in consideration of the arrangement with other parts. A pipe, such as a hose, through which a fluid can move may be connected to the outlet of the gas moving path 210 to transfer the gas to an external analysis apparatus. However, when ignition of the battery is expected, the punching part may be separated from the pressing jig part in order to prevent damage to the punching part after forming a ventilating hole in the pouch case. In this case, the outlet of the gas moving path 210 may be formed at a position where the punching part is coupled, not at the side surface of the pressing jig part.

The punching part 400 may be inserted into the through hole 110 from the outside of the pouch case 13 to form a ventilating hole in the first sheet 13a wherein the ventilating hole allows the gas to be discharged to the outside of the pouch case 13 and to flow into the gas moving path 210. The punching part 400 is coupled to a surface of the pressing jig part 200 opposite to a surface of the pressing jig part 200 contacting the secondary battery 10; and a needle hole 220 penetrating the inside of the pressing jig part may be formed in the pressing jig part 200 so that a needle 410 provided in the punching part 400 protrudes to the surface of the pressing jig part 200 contacting the secondary battery 10.

As shown in FIG. 6, the punching part 400 may include a needle 410 for drilling a hole in the pouch, a body part 420 having one end to which the needle 410 is fixed and having a diameter larger than a diameter of the needle 410, a button (not shown) connected to the other end of the body part 420 to press the body part 420, and an elastic member (not shown) providing a restoring force for the body part 420 to move the body part 420 to its original position after the body part 420 is pressed, and a stopper (not shown) that restricts the upper or lower limit of the reciprocating motion of the body part 420.

A portion of the body part 420 is inserted into the needle hole 220 formed in the pressing jig part 200, and the body part 420 may reciprocate along the needle hole 220. The needle hole 220 is formed to penetrate the pressing jig part 200 in a direction perpendicular to a surface of the pressing jig part 200 facing the pouch case 13, and the body part 420 may be inserted into a surface opposite to a surface of the pressing jig part 200 facing the pouch case 13. A diameter of some sections of the needle hole 220 into which the body part 420 is inserted is formed to be substantially the same as a diameter of the body part 420, and a second sealing member (not shown) may be inserted into an inner surface of the needle hole 220 and a side surface of the body part 420. A groove into which the second sealing member is inserted may be formed in the body part 420.

The needle 410 protrudes to an inlet of the needle hole 220 formed on a surface of the pressing jig part 200 facing the pouch case 13 to form a ventilating hole in the pouch case 13. The inlet of the needle hole 220 formed on the surface of the pressing jig part 200 facing the pouch case 13 may be the same hole as an inlet of the gas moving path 210. That is, the needle hole 220 and the gas moving path 210 may share some sections.

The gas-collecting apparatus of the present disclosure may further include a jig fixing mean 500 connected to the pressing jig part 200 and the supporting jig part 300 to fix the relative position between the pressing jig part 200 and the supporting jig part 300 in a state that the pressing jig part 200 and the supporting jig part 300 are in close contact with the secondary battery 10 interposed therebetween. The jig fixing mean 500 may be a bolt. The jig fixing mean 500 may be inserted into a screw hole formed at an edge of the pressing jig part 200 and the supporting jig part 300 to be coupled to the pressing jig part 200 and the supporting jig part 300.

As shown in FIG. 7, the jig fixing mean 500 may include a first jig fixing mean 510 and a second jig fixing mean 520; and a virtual straight line connecting two points through which the first jig fixing mean 510 and the second jig fixing mean 520 pass on a virtual plane including the insert plate part 100 between the pressing jig part 200 and the supporting jig part 300 may penetrate the insert plate part 100. That is, at least one pair of coupling positions of the fixing means provided in plural may interpose the insert plate therebetween.

Hereinafter, a method for collecting the internal gas of the secondary battery 10 using the gas-collecting apparatus of the present disclosure will be described.

The method for collecting the internal gas of the secondary battery 10 may include: a step of inserting an insert plate part 100, a step of pressing a pressing jig part 200, a punching step, and a collecting step.

The step of inserting an insert plate part 100 may be a step in which the secondary battery 10 is made into a state to be analyzed, and then, the insert plate part 100 is placed inside a pouch case 13 of the secondary battery 10, and the pouch case 13 is sealed so that external gas does not flow into the pouch case 13. The state of the secondary battery 10 to be analyzed may be a state before and after activation, a state before and after high temperature storage, a state before and after charging, etc.

The step of pressing a pressing jig part 200 may be a step in which an O-ring, which is a first sealing member, is disposed at a position of a sealing groove 120 of the insert plate part 100 on an outer surface of a first sheet 13a of the pouch case 13, and then, the O-ring is pressed by the pressing jig part 200.

The punching step may be a step of pressing a button of a punching part 400 to form a ventilating hole in the first sheet 13a of the pouch case 13. The punching step may be omitted if a ventilating hole is previously formed in the pouch case 13.

The collecting step may be a step of connecting to a sampling cell or a gas analysis apparatus to collect the generated gas for each change in voltage, temperature, time, etc. of the secondary battery 10. As shown in FIG. 8, the gas generated in an electrode assembly 11 of the secondary battery 10 flows through a gas flow path 130 of the insert plate part 100 to a through hole 110, and then, may flow through a gas moving path 210 of the pressing jig part 200 to the sampling cell or the gas analysis apparatus outside the collecting apparatus.

Although embodiments according to the present disclosure have been described above, it will be understood that the embodiments are merely exemplary, and various modifications and other embodiments having equivalent scope can be made from the above embodiments by those skilled in the art. Therefore, the true technical scope of the present disclosure to be protected should be defined by the following claims.

INDUSTRIAL APPLICABILITY

The gas-collecting apparatus of the present disclosure can be utilized consistently for secondary batteries of all sizes regardless of a change in the specifications of the batteries.

The gas-collecting apparatus of the present disclosure immediately collects gas inside a pouch case without requiring a process of diffusing the gas in a separate chamber, thereby reducing a space for gas diffusion. Therefore, since the gas generated in the secondary battery can be collected in a smaller space, it is possible to increase the efficiency of analysis by collecting a high concentration of gas.

A pressing jig part of the gas-collecting apparatus of the present disclosure only needs to press an area equal to that of the insert plate part, and thus, contacts and presses only a local area of a secondary battery. Therefore, even if the jig is coupled to the secondary battery, the secondary battery has an exposed area that is not coupled to the jig. This exposed area can be used to connect accessory parts for various analyses.

The gas-collecting apparatus of the present disclosure securely fixes only a portion of the secondary battery with a pressing jig part and an insert plate part, and therefore, even if the shape and size of the secondary battery changes during the analysis, it is possible to smoothly collect the gas.

Even if the gas-collecting apparatus of the present disclosure is damaged by ignition of the secondary battery, only an insert plate part or a pressing jig part needs to be replaced, thereby reducing the maintenance cost of the apparatus.

In the case of an O-ring applied to the structure of the gas-collecting apparatus of the present disclosure, its area is 2 to 1000 times smaller than that of the O-ring used in the conventional collecting apparatuses, thereby effectively improving leakage due to the O-ring.

What is claimed is:

1. A gas-collecting apparatus for collecting gas generated in a secondary battery comprising an electrode assembly and a flexible pouch case accommodating the electrode assembly therein, wherein the pouch case includes a first sheet covering one surface of the electrode assembly and a second sheet covering the other surface of the electrode assembly, wherein the gas-collecting apparatus comprises:

an insert plate part in close contact with the first sheet inside the pouch case; and a pressing jig part in close contact with the insert plate part outside the pouch case with the first sheet interposed therebetween, wherein the insert plate part includes a through hole penetrating the insert plate part so that a first surface of the insert plate part facing the first sheet and a second surface opposite to the first surface are connected to each other, and wherein a gas moving path of which one end is connected to the through hole and through which the gas generated in the secondary battery flows is formed inside the pressing jig part.

2. The gas-collecting apparatus of claim 1, further comprising a punching part inserted into the through hole from the outside of the pouch case for forming a ventilating hole in the first sheet, wherein the ventilating hole allows the gas to be discharged to the outside of the pouch case and to flow into the gas moving path.

3. The gas-collecting apparatus of claim 2, wherein the punching part is coupled to a surface of the pressing jig part opposite to a surface of the pressing jig part contacting the secondary battery, and wherein a needle hole penetrating the inside of the pressing jig part is formed in the pressing jig part so that a needle provided in the punching part protrudes to the surface of the pressing jig part contacting the secondary battery.

4. The gas-collecting apparatus of claim 1, wherein a sealing groove having a closed curve shape in which the through hole is placed inside is formed on the first surface of the insert plate part or on a surface of the pressing jig part in close contact with the first sheet; and wherein a first sealing member made of an elastic material is inserted into the sealing groove to prevent the gas from leaking into a contacting surface between the first sheet and the pressing jig part.

5. The gas-collecting apparatus of claim 4, wherein the first sealing member is an O-ring.

6. The gas-collecting apparatus of claim 1, wherein the insert plate part includes a gas flow path connected to the through hole from an edge of the insert plate part.

7. The gas-collecting apparatus of claim 6, wherein the gas flow path is formed by a groove extending from the through hole to the edge of the insert plate part on the second surface of the insert plate part; and wherein the gas flow path is provided in plural, and the plurality of gas flow paths are disposed radially symmetrically around the through hole.

8. The gas-collecting apparatus of claim 1, further comprising a supporting jig part facing and being in close contact with the pressing jig part with the secondary battery interposed therebetween, outside the pouch case.

9. The gas-collecting apparatus of claim 8, further comprising a jig fixing mean connected to the pressing jig part and the supporting jig part to fix a relative position between the pressing jig part and the supporting jig part in a state that the pressing jig part and the supporting jig part are in close contact with the secondary battery interposed therebetween.

10. The gas-collecting apparatus of claim 9, wherein the jig fixing mean is provided in plural, wherein the plurality of jig fixing means include a first jig fixing mean and a second jig fixing mean, and wherein a virtual straight line connecting two points through which the first jig fixing mean and the second jig fixing mean pass on a virtual plane including the insert plate part between the pressing jig part and the supporting jig part penetrates the insert plate part.

* * * * *